United States Patent [19]

Suzuki

[11] Patent Number: 4,723,416
[45] Date of Patent: Feb. 9, 1988

[54] CONTROL SYSTEM FOR VARIABLE CAPACITY TYPE COMPRESSOR FOR AIR CONDITIONING SYSTEM OF VEHICLE

[75] Inventor: Nobuhiko Suzuki, Konan, Japan

[73] Assignee: Diesel Kiki Co., Ltd., Tokyo, Japan

[21] Appl. No.: 50,545

[22] Filed: May 14, 1987

[30] Foreign Application Priority Data

May 22, 1986 [JP] Japan .......................... 61-077575[U]

[51] Int. Cl.$^4$ .............................................. F25B 1/00
[52] U.S. Cl. ...................................... 62/226; 62/228.5
[58] Field of Search ............ 62/228.3, 228.5, 226–229, 62/133; 417/270

[56] References Cited

U.S. PATENT DOCUMENTS

| | | | |
|---|---|---|---|
| 4,157,233 | 6/1979 | Horiuchi . | |
| 4,628,700 | 12/1986 | Alsenz ............................ | 62/228.3 X |
| 4,669,272 | 6/1987 | Kawai et al. ...................... | 62/228.3 |

FOREIGN PATENT DOCUMENTS 53-107042  9/1978  Japan .
59-182059 12/1984  Japan .
0131845   8/1987  Japan .......................... 62/220

*Primary Examiner*—William E. Wayner
*Attorney, Agent, or Firm*—Frishauf, Holtz, Goodman & Woodward

[57] ABSTRACT

A control system for controlling a compressor for an air conditioning system of a vehicle. A variable capacity type compressor is disposed to be driven by an engine of the vehicle. The compressor is adapted to vary in capacity with a change in pressure within a crank chamber thereof. A first calculator calculates thermal load on the air conditioning system, and a second calculator calculates the rotational speed of the engine. An upper limit setter sets an upper limit value of suction pressure within the compressor in such a manner that the upper limit value is increased with an increase in the thermal load, and decreased with an increase in the rotational speed of the engine. A capacity controller is responsive to a difference between the set upper limit value of suction pressure and the sensed actual suction pressure for adjusting the pressure within the crank chamber to vary the capacity of the compressor.

3 Claims, 3 Drawing Figures

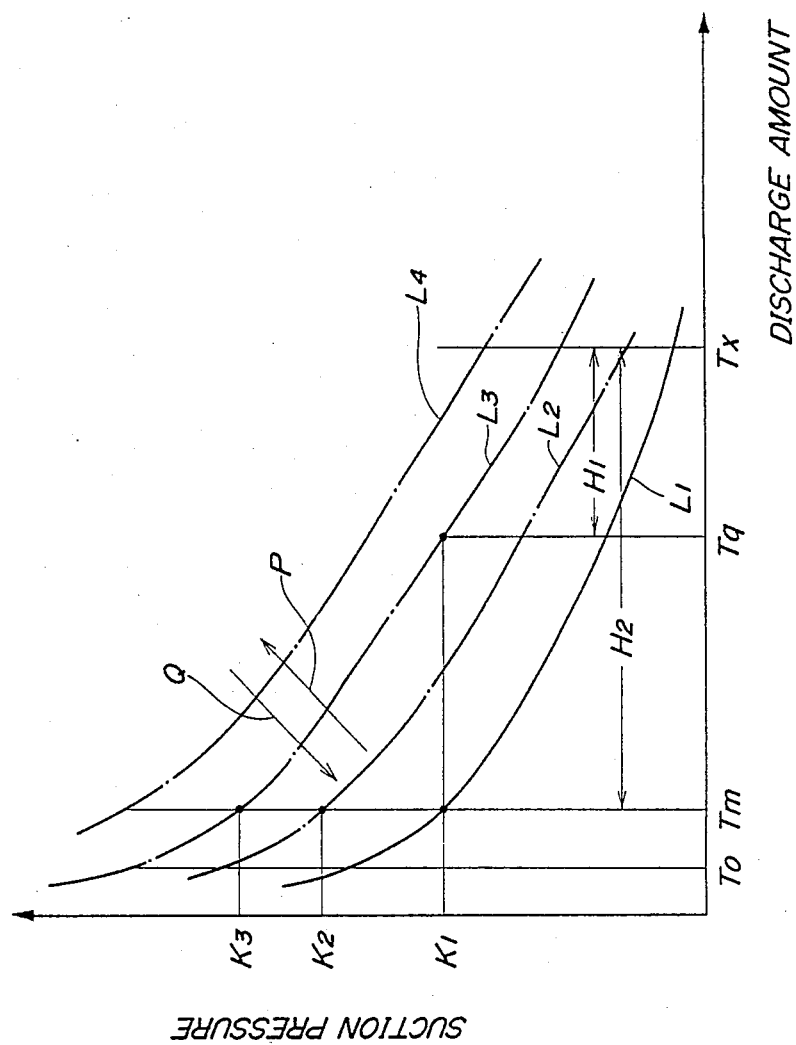

CONTROL SYSTEM FOR VARIABLE CAPACITY TYPE COMPRESSOR FOR AIR CONDITIONING SYSTEM OF VEHICLE

BACKGROUND OF THE INVENTION

The present invention relates to a control system for a variable capacity type compressor for air conditioning systems of vehicles and, more particularly, to a control system for a variable capacity type compressor which is constructed such that the suction pressure is varied by pressure control means.

Conventional variable capacity compressors include a type which comprises a crank chamber, a drive shaft arranged in the crank chamber, a wobble plate fitted on the drive shaft for rotation therewith and axial tilting relative thereto, and pistons coupled to the wobble plate for reciprocating motions in response to rotation of the wobble plate, wherein the wobble plate assumes angularity or angle of inclination determined by pressure within the crank chamber, and a change in the angularity of the wobble plate causes a corresponding change in the reciprocating stroke of the pistons to thereby vary the compressor capacity, as is known, e.g. from U.S. Pat. No. 4,157,233.

In a compressor in general including the type referred to above, the power required for driving the compressor is directly proportional to the ratio of the discharge pressure (i.e. discharge amount) to the suction pressure, and therefore operation at high efficiency can be ensured when the ratio of the discharge pressure to the suction pressure is minimum. To this end, techniques have conventionally been employed in which the compressor is operated at an allowable maximum suction pressure, or at an allowable minimum discharge pressure or discharge amount. For example, Japanese Provisional Patent Publication (Kokai) No. 53-107042 discloses a first technique in which an upper limit value of the suction pressure is set independently of the compressor capacity, and the compressor capacity is increased to lower the suction pressure when the suction pressure exceeds the set upper limit value due to an increase in thermal load on the air conditioning system or due to other causes. Further, Japanese Provisional Utility Model Publication (Kokai) 59-182059 discloses a second technique in which an allowable, predetermined minimum discharge amount (i.e., minimum capacity) is set, and measures can be taken to stop the compressor when a situation that the capacity falls below the minimum capacity is brought about due to decrease in the thermal load, or due to other causes.

In the above-described first technique in which the upper limit value of the suction pressure is merely set, no irrationality would occur if the thermal load varies to a smaller value or decreases. If the thermal load varies to a larger value or increases, however, irrationality would occur that since the compressor capacity is increased when the suction pressure exceeds the upper limit value, the compressor cannot operate at a value equal to or lower than the increased capacity, in spite of the fact that the increased capacity is too large for the increased thermal load.

The above-described second technique, which interrupts the operation of the compressor if only the capacity is at the value equal to or lower than the allowable minimum capacity, has the disadvantage that as the operation in which the minimum capacity is maintained continues for a long time, the recirculation of lubricating oil within the compressor would be deteriorated, and this would tend to cause so-called seizure. Moreover, since it is necessary to increase pressure within the crank chamber so as to keep the angularity of the wobble plate at the minimum, there would be a fear that the compressor is damaged by the long-time increase in the crank chamber pressure.

As described above, in either of the conventional techniques, the operation of the variable capacity type compressor is based on whether or not there is a variation of an operating parameter with respect to a single set value thereof. Therefore, no measures are taken in compliance with the vehicle running conditions such as the thermal load, the engine operating condition and the like, and no sufficient consideration is made to the compressor operation at high efficiency and to the compressor operation over a long service life.

OBJECT AND SUMMARY OF THE INVENTION

It is an object of the invention to provide a control system for a variable capacity compressor for an air conditioning system of a vehicle, which can ensure an operation at high efficiency and over a long service life.

The present invention provides a control system for controlling a compressor for an air conditioning system of a vehicle, wherein the compressor is a variable capacity type disposed to be driven by an engine of the vehicle, has a crank chamber defined therein, and is adapted to vary in capacity with a change in pressure within the crank chamber.

The control system according to the present invention is characterized by comprising:
first calculating means for calculating thermal load on the air conditioning system;
second calculating means for calculating rotational speed of the engine;
upper limit setting means for setting an upper limit value of suction pressure within the compressor, the upper limit setting means setting the upper limit value in a manner such that the upper limit value is increased with an increase in the thermal load, and decreased with an increase in the rotational speed of the engine;
pressure sensing means for sensing actual suction pressure within the compressor; and
capacity control means responsive to a difference between the set upper limit value of suction pressure and the sensed actual suction pressure for adjusting the pressure within the crank chamber to vary the capacity of the compressor.

The above and other objects, features and advantages of the invention will become more apparant from the ensuing detailed description taken in conjunction with the accompanying drawings.

BRIEF DESCRIPTION OF THE DRAWINGS

FIG. 3 is a graphical representation of the relationship between suction pressure and discharge amount of the compressor shown in FIG. 1.

DETAILED DESCRIPTION

Figure 1:
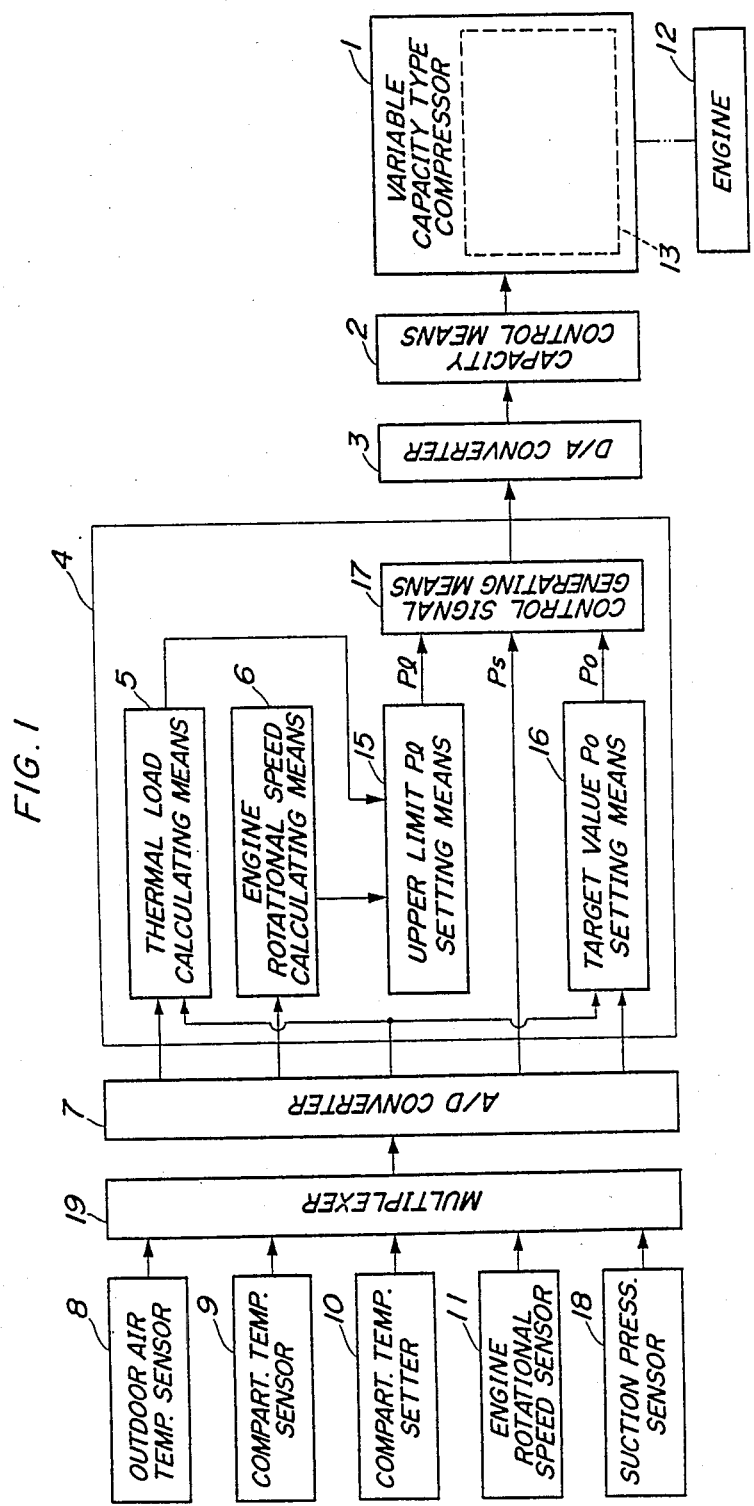
FIG. 1 is a block diagram showing an embodiment of a control system for a variable capacity type compressor according to the invention.

Referring to FIG. 1, there is shown an embodiment of a control system for controlling a compressor for an air conditioner of a vehicle, according to the invention. As shown in FIG. 1, an outdoor air temperature sensor 8, a compartment temperature sensor 9 and the like are provided at suitable locations of the vehicle, as thermal load sensing elements. Further provided are a compartment temperature setter 10 for setting the compartment temperature to a target value, a rotational speed sensor 11 for sensing the rotational speed of an engine 12, and a pressure sensor 15 for sensing the suction pressure within the compressor 1. Analog outputs from these sensors 8, 9, 11 and 15 and the setter 10 are converted into respective digital signals by an A/D converter 7. Digital outputs from the A/D converter 7 are supplied to a microcomputer 4. In the microcomputer 4, thermal load calculating means 5 is responsive to output from the A/D converter 7 for effecting a calculation of thermal load on the air conditioning system based upon outputs from the thermal load sensing elements 8, 9, etc. Rotational speed calculating means 6 is responsive to output from the A/D converter 7 for effecting a calculation of the rotational speed of the engine 12 based upon output from the rotational speed sensor 11. An upper limit setting means 15 is connected to the output side of the calculating means 5, 6 for setting an upper limit value P1 of the suction pressure within the compressor 1 in response to outputs from the calculating means 5, 6.

According to the invention, the upper limit value P1 is set in such a manner that it is set to increase with an increase in the thermal load, and to decrease with an increase in the rotational speed of the engine 12. To be specific, as the thermal load increases due, for example, to a rise in the temperature of the outdoor air, an increase in the number of passengers or the like, the upper limit setting means 15 raises the upper limit value P1 of the suction pressure in response to an output indicative of increased thermal load from the thermal load calculating means 5, and at this time if the rotational speed of the engine 12 is raised due to a shift to a high speed running of the vehicle or the like, the upper limit setting means 15 lowers the set upper limit value P1 of the suction pressure in response to an output indicative of increased engine rotational speed from the rotational speed calculating means 6. A target value setting means 16 is responsive to output from the A/D converter 7 for setting a target value Po of the suction pressure, as a function of the difference between a set compartment temperature set by the compartment temperature setter 10 and the actual compartment temperature sensed by the compartment temperature sensor 9. A control signal generating means 17 is responsive to outputs P1, Po from the upper limit setting means 15 and the target value setting means 16 as well as an output indicative of the actual suction pressure from the pressure sensor 18 through the A/D converter 7, to generate a control signal. The control signal from the control signal generating means 17 is converted into an analog signal by a D/A converter 3, and in response to which capacity control means 2 operates to vary the dischange amount of the compressor 1 so that the suction pressure Ps reaches the target value Po.

The compressor 1 is a variable capacity type compressor 1 which is disposed to be driven by the engine 12 of the vehicle. The compressor 1 has a crank chamber 13 defined therein, and in which is arranged a wobble plate, not shown. In practice, preferably the pressure control means 2 is formed of a solenoid valve adapted to adjust the degree of communication between the crank chamber 13 and a suction chamber, not shown, within the compressor 1. For instance, so long as the actual suction pressure Ps is below the set target value Po, the solenoid valve 2 operates to decrease the degree of communication between the crank chamber and the suction chamber so as to raise the pressure within the crank chamber 13 whereby the angularity of the wobble plate is decreased to decrease the discharge amount or capacity of the compressor 1. As the capacity of the compressor 1 is thus decreased, the discharge pressure is accordingly lowered. On the other hand, if the actual suction pressure Ps exceeds the target value Po, the solenoid valve 2 operates to increase the above degree of communication so as to lower the crank chamber pressure to increase the discharge amount and hence raise the discharge pressure.

The operation of the control system shown in FIG. 1 will now be described with reference to FIGS. 2 and 3.

Figure 2:
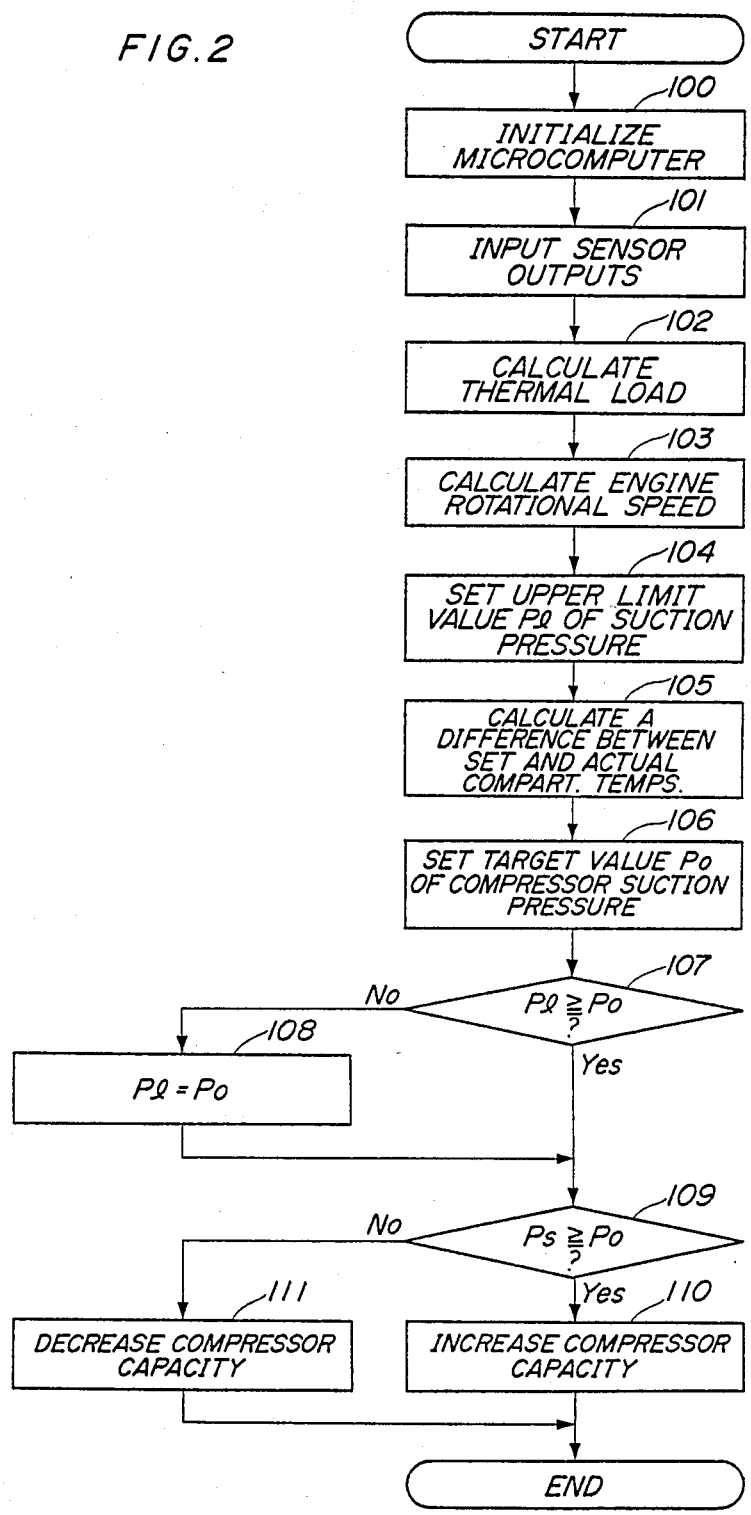
FIG. 2 is a flow chart showing a program for controlling the compressor shown in FIG. 1.

As shown in the flow chart of FIG. 2, as the program starts, initialization of the microcomputer 4 such as resetting is performed at a step 100. In a subsequent step 101, outputs from the sensors shown in FIG. 1 are inputted. In a step 102, a calculation of the thermal load is carried out, based upon outputs from the outdoor air temperature sensor 8, the compartment temperature sensor 9, etc. In a step 103, a calculation of the rotational speed of the engine is carried out, based upon an output from the rotational speed sensor 11. In a step 104, the upper limit value P1 of the compressor suction pressure is set by the upper limit setting means 15, based upon the results of calculations at the steps 102 and 103, in the manner described before.

Then, in a step 105, a difference between the compartment temperature value set by the compartment temperature setter 10 and the actual compartment temperature sensed by the compartment temperature sensor 9 is calculated, and in a step 106 the target value Po of the compressor suction pressure is set, by the target value setting means 16, to a value corresponding to the calculated difference between the set compartment temperature and the actual compartment temperature. In a step 107, it is determined whether the set target value Po is compared with the set upper limit than P1. If Po is higher than or equal to P1, Po is set to a value equal to P1 at a step 108. If Po is lower than P1, Po is directly applied. In a step 109, it is determined whether or not Ps exceeds Po. If the answer is yes, the capacity control means 2 operates to increase the discharge amount of the compressor 1 at a step 110. If Po is lower than Ps, the capacity control mens 2 operates to decrease the discharge amount at a step 111. The execution of step 110 or 111 is followed by termination of the program.

The above-described operation will be described in further detail with reference to FIG. 3. It is supposed that the variable capacity type compressor 1 can operate within a range from the minimum discharge amount To to the maximum discharge amount Tx, and the actually allowable minimum discharge amount is Tm.

In the case where the variable capacity type compressor 1 operates under, for example, a low thermal load condition along an operating curve $L_1$ having the set upper limit value $K_1$ at the minimum discharge amount Tm, if the thermal load increases due to a rise in the compartment temperature or the like, the compressor 1 is caused to operate along an operating curve $L_3$, and the set upper limit value of the suction pressure is increased to $K_3$ correspondingly. According to the prior art, if such thermal load variation occurs, the discharge amount can vary only within a range between $T_x$ and $T_q$, that is, a range designated by $H_1$, because the set upper limit value of the suction pressure is set at the single value $K_1$. As distinct from the prior art, it is possible for the invention that the discharge amount can vary within an enlarged range between $T_x$ and $T_m$, that is, a range designated by $H_2$.

Furthermore, at that time, if the rotational speed of the engine increases due to a shift to a high speed running of the vehicle or the like, the set upper limit value of the suction pressure is lowered, for example, to $K_2$. After that, the compressor 1 operates along an operating curve $L_2$ corresponding to the lowered, set upper limit value $K_2$. In FIG. 3, the arrow P indicates the direction in which the thermal load increases, and the arrow Q indicates the direction in which the rotational speed of the engine 12 increases.

As described above, according to the invention, the set upper limit value of the suction pressure can vary following the thermal load on the air conditioning system of the vehicle and the rotational speed of the engine of the vehicle. Thus, the operating range of the compressor is considerably enlarged. This prevents the operation of the compressor at the minimum capacity from continuing for a long period of time, making it possible to effectively prevent so-called seizure from occurring. Further, as a result that the operation at the minimum capacity is prevented from continuing for a long period of time, abnormally high pressure within the crank chamber is eliminated, and hence a fear is minimized that the compressor is damaged. Furthermore, the repeated frequency of the actuation and stoppage of the compressor is considerably reduced as compared with the prior art arrangement in which the minimum running capacity is set at a fixed value to perform actuation and stoppage of the compressor. This considerably reduces the frequency of harmful shocks on the compressor. Thus, it is ensured that the compressor operates at high efficiency and over a long service life.

What is claimed is:

1. A control system for controlling a compressor for an air conditioning system of a vehicle, said compressor being a variable capacity type disposed to be driven by an engine of said vehicle, said compressor having a crank chamber defined therein, and being adapted to vary in capacity with a change in pressure within said crank chamber, said control system comprising:
   first calculating means for calculating thermal load on said air conditioning system;
   second calculating means for calculating rotational speed of said engine;
   upper limit setting means for setting an upper limit value of suction pressure within said compressor, said upper limit setting means setting said upper limit value in a manner such that said upper limit value is increased with an increase in said thermal load, and decreased with an increase in the rotational speed of said engine;
   pressure sensing means for sensing actual suction pressure within said compressor; and
   capacity control means responsive to a difference between the set upper limit value of suction pressure and the sensed actual suction pressure for adjusting the pressure within said crank chamber to vary the capacity of said compressor.

2. A control system as claimed in claim 1, wherein said capacity control means operates to increase the capacity of said compressor when the sensed actual suction pressure exceeds the set upper limit value of suction pressure.

3. A control system as claimed in claim 1, including:
   compartment temperature setting means for setting a desired temperature within a compartment of said vehicle;
   means for sensing temperature within said compartment;
   target value setting means for setting a target value of suction pressure corresponding to a difference between the set desired temperature within said compartment and the sensed temperature within said compartment; and
   means for comparing the set target value of suction pressure with the set upper limit value of suction pressure and setting the target value to a value equal to the set upper limit value when the former is higher than the latter;
   said capacity control means being responsive to a difference between the set target value of suction pressure and the sensed actual suction pressure to vary the capacity of said compressor.

* * * * *